(12) United States Patent
Shoji et al.

(10) Patent No.: US 7,916,370 B2
(45) Date of Patent: Mar. 29, 2011

(54) LASER SCANNING MICROSCOPE AND SCANNER DRIVE DEVICE

(75) Inventors: Hirokazu Shoji, Yokohama (JP); Hiroshi Kishimoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/814,230

(22) Filed: Jun. 11, 2010

(65) Prior Publication Data

US 2010/0253988 A1  Oct. 7, 2010

Related U.S. Application Data

(63) Continuation of application No. PCT/JP2008/072612, filed on Dec. 12, 2008.

(30) Foreign Application Priority Data

Dec. 13, 2007  (JP) .................... 2007-322065

(51) Int. Cl.
 *G02B 26/08* (2006.01)
(52) U.S. Cl. ............... 359/196.1; 359/201.1; 359/201.2; 359/202.1; 359/199.1; 359/368
(58) Field of Classification Search .... 359/196.1–226.2, 359/368–391
See application file for complete search history.

(56) References Cited

U.S. PATENT DOCUMENTS

| 2002/0041439 A1 | 4/2002 | Engelhardt et al. |
| 2009/0237627 A1* | 9/2009 | Kobori et al. ................ 353/98 |
| 2009/0244677 A1* | 10/2009 | Mizukami et al. ......... 359/225.1 |

FOREIGN PATENT DOCUMENTS

JP  2003-098468 A  4/2003

OTHER PUBLICATIONS

International Search Report for International Application No. PCT/JP2008/072612 mailed on Jan. 20, 2009, 2 pages.

* cited by examiner

*Primary Examiner* — James Phan
(74) *Attorney, Agent, or Firm* — Osha • Liang LLP

(57) ABSTRACT

A laser scanning microscope scans a plurality of scanning areas based on a drive table to indicate time series data for driving a scanner used for performing scanning with laser light. The laser scanning microscope includes a drive table creation unit and a drive control unit. The drive table creation unit is applied for creating an interpolating drive table for specifying a scanning path between an end point of a first scanning area and a start point of a second scanning area which is scanned next to the first scanning area. The drive control unit is applied for controlling driving of the scanner based on the interpolating drive table between the first scanning area and the second scanning area.

6 Claims, 10 Drawing Sheets

LASER SCANNING MICROSCOPE AND SCANNER DRIVE DEVICE

CROSS-REFERENCE TO RELATED APPLICATION

The present application is a Continuation and claims benefit, pursuant to 35 U.S.C. §120, of International Application No. PCT/JP2008/072612 filed on Dec. 12, 2008 and incorporated by reference in its entirety herein. This application is based upon and claims the benefit of priority from prior Japanese Patent Application No. 2007-322065, filed Dec. 13, 2007, the entire contents of which are incorporated herein by reference.

TECHNICAL FIELD

The present invention relates to a laser scanning microscope and scanner drive device, and more particularly to a laser scanning microscope and scanner drive device that can continuously scan a plurality of scanning areas.

BACKGROUND ART

Confocal laser scanning microscopes in which a sample is irradiated with and scanned by laser light and only fluorescent light emitted from the focal plane of the laser light, out of the fluorescent light emitted from the sample, is extracted by a pin hole to observe the sample, have been popular (e.g. see Patent Document 1). Some confocal laser scanning microscopes can observe a plurality of scanning areas continuously by continuously scanning a plurality of scanning areas.

Now a case of sequentially scanning a scanning area A1, scanning area A2 and scanning area A3 in FIG. 10 using a conventional confocal laser scanning microscope, is considered. First a drive table, which is a data string to control scanning of the scanning area A1, is stored in a memory, and the scanning area A1 is scanned based on the drive table stored in the memory. Then the memory is overwritten by a drive table for the scanning area A2, and the scanning area A2 is scanned based on the updated drive table, and finally the memory is overwritten with a drive table for the scanning area A3, and the scanning area A3 is scanned based on the updated drive table.

[Patent Document 1] Japanese Patent Application Laid-Open No. 2003-98468

It takes some time to stabilize operation of a scanner that controls the angle of a mirror used for performing scanning with the laser light and a scanner drive system for driving the scanner. Therefore if the scanning path is linearly moved from the end point of the scanning area A1 to the start point of the scanning area A2, to start scanning from the beginning of the scanning area A2, after scanning in the scanning area A1 is completed, as shown in FIG. 10, the first several lines of the scanning area A2 may not be scanned accurately, and such a problem as distortion may occur in the obtained image.

In order to perform stable scanning from the beginning of the scanning area A2, an auxiliary scanning area for stabilizing operation of the scanner drive system, including the electric and mechanical systems, must be disposed before the scanning area A2, which generates a delay in processing time.

DISCLOSURE OF THE INVENTION

With the foregoing in view, it is an object of the present invention to provide means for scanning a plurality of scanning areas accurately and continuously, and decreasing the delay in processing time due to switching of the scanning areas.

A laser scanning microscope according to a first aspect of the present invention is a laser scanning microscope that scans a plurality of scanning areas based on a drive table to indicate time series data for driving a scanner used for performing scanning with laser light, comprising: creation means for creating an interpolating drive table, which is the drive table for specifying a scanning path between an end point of a first scanning area and a start point of a second scanning area which is scanned next to the first scanning areas; and drive control means for controlling driving of the scanner based on the interpolating drive table between the first scanning area and the second scanning area.

A scanner drive device according to a first aspect of the present invention is a scanner drive device that drives a scanner used for performing scanning with laser light for a laser scanning microscope so as to scan a plurality of scanning areas based on a drive table to indicate time series data for driving the scanner, comprising: creation means for creating an interpolating drive table, which is a drive table for specifying a scanning path between an end point of a first scanning area and a start point of a second scanning area which is scanned next to the first scanning area; and drive control means for controlling driving of the scanner based on the interpolating drive table between the first scanning area and the second scanning area.

According to the first aspect of the present invention, the interpolating drive table, which is the drive table for specifying a scanning path between an end point of a first scanning area and a start point of a second scanning area which is scanned next to the first scanning area, is created, and it is controlled so that the scanner is driven based on the interpolating drive table between the first scanning area and the second scanning area.

A laser scanning microscope according to a second aspect of the present invention is a laser scanning microscope that scans a plurality of scanning areas on a sample by a scanner used for performing scanning with laser light, comprising drive control means for controlling driving of the scanner, so that a first angle at an acute angle side formed by a path between an end point of a first scanning area and a start point of a second scanning area, which is scanned next to the first scanning area, up to just before the start point of the second scanning area, and by an extended line obtained by extending the scanning path from the start point of the second scanning area in an opposite direction of the path direction, becomes smaller than a second angle at an acute angle side formed by a scanning path obtained when the end point of the first scanning area is connected to the start point of the second scanning area with a straight line, and by the extended line.

According to the second aspect of the present invention, the first angle at the acute angle side formed by a path between the end point of the first scanning area and the start point of the second scanning area which is scanned next to the first scanning area, up to just before the start point of the second scanning area, and by an extended line obtained by extending the scanning path from the start point of the second scanning area in an opposite direction of the path direction, is controlled to be smaller than the second angle at the acute angle side formed by a scanning path obtained when the end point of the first scanning area is connected to the start point of the second scanning area with a straight line, and by the extended line.

According to the first aspect or the second aspect of the present invention, the scanning paths in the interpolating moving areas between a plurality of scanning areas can be controlled. Particularly according to the first aspect or the second aspect of the present invention, a plurality of scanning areas can be accurately and continuously scanned, and a delay in processing time due to switching of the scanning areas can be decreased.

Figure 1:
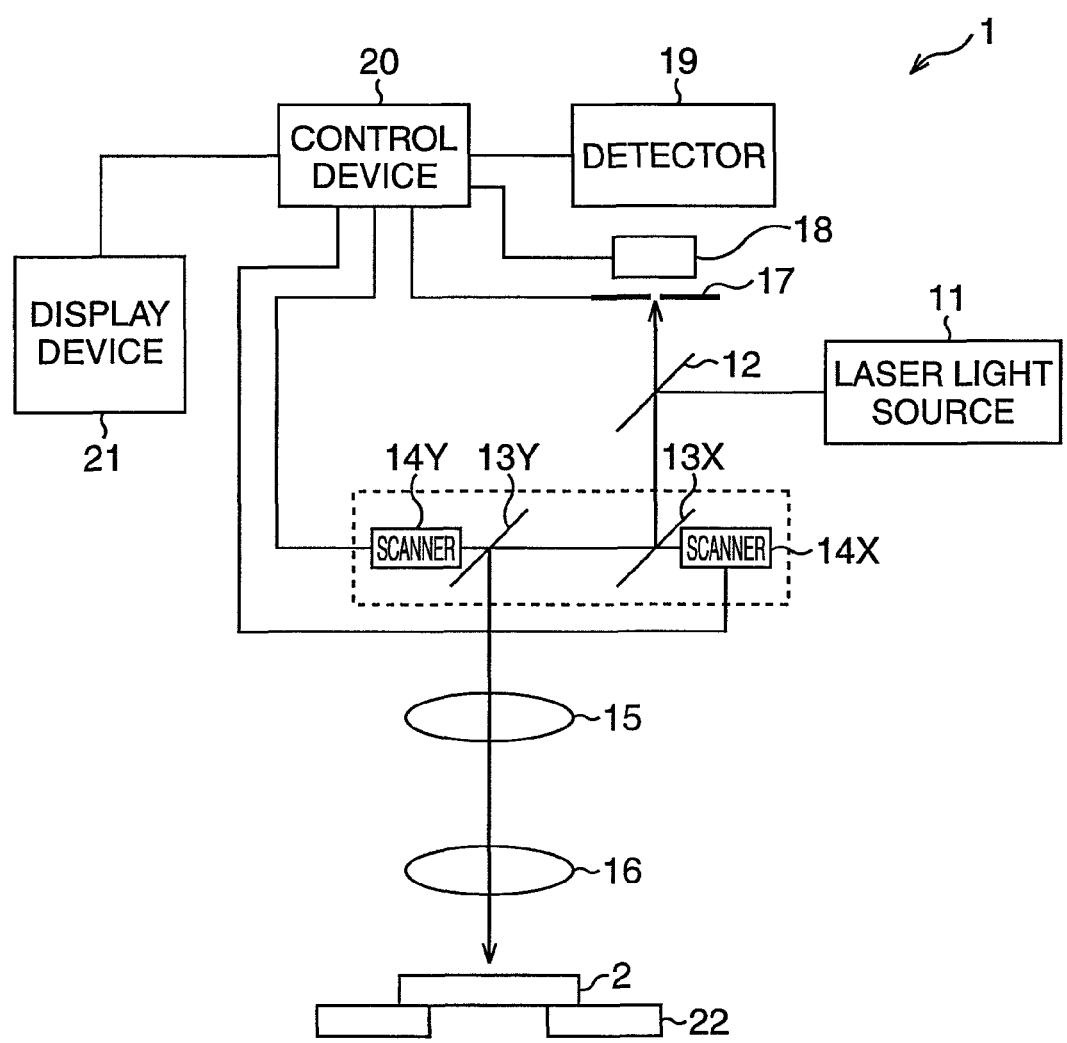
FIG. 1 is a diagram depicting an embodiment of an optical system of a confocal laser scanning microscope to which the present invention is applied.

EXPLANATION OF REFERENCE NUMERALS 1 confocal laser scanning microscope
13X and 13Y mirror
14X and 14Y scanner
51 scanner drive system
61 controller
62 reference clock generator
63 divider
64X and 64Y divider
65X and 65Y address generator
66X and 66Y memory
68X and 68Y drive circuit
81 drive table creation unit
82 drive control unit

BEST MODE FOR CARRYING OUT THE INVENTION

Embodiments of the present invention will now be described with reference to the drawings.

FIG. 1 is a diagram depicting an embodiment of an optical system of a confocal laser scanning microscope 1 to which the present invention is applied. The operation of the optical system of the confocal laser scanning microscope 1 will now be described.

The laser light (excitation light) emitted from the laser light source 11 is guided to a scanner optical system via an optical fiber (not illustrated) of which output end is connected to a fiber connector (not illustrated). The laser light guided into the scanner optical system is reflected in a direction to a mirror 13X by a dichroic mirror 12. The mirrors 13X and 13Y are constituted by total reflection mirrors, and the laser light reflected in a direction to the mirror 13X is reflected in a direction to a scanning lens system 15 by the mirror 13X and mirror 13Y. The laser light is condensed by transmitting through the scanning lens system 15 and an objective lens 16, and is irradiated onto a sample 2 on a stage 22.

A control device 20 drives a scanner 14X, performs scanning with laser light irradiated onto the sample 2 in the left and right directions (x axis direction) of the confocal laser scanning microscope 1 by controlling the angle of the mirror 13X, drives a scanner 14Y, and performs scanning with the laser light irradiated onto the sample 2 in the depth direction (y axis direction) of the confocal laser scanning microscope 1 by controlling the angle of the mirror 13Y.

The fluorescent light, which is excited by irradiation of the laser light and emitted from the sample 2, transmits through the objective lens 16 and the scanning lens system 15, descanned by the mirror 13Y and mirror 13X, and transmits through the dichroic mirror 12. Then only the fluorescent light emitted from the focal plane on the objective lens 16, out of the descanned fluorescent light, passes through a pin hole 17, predetermined wavelength components are filtered through a fluorescent filter 18, and is converted into electric signals by a detector 19 constituted by a PMT (PhotoMulTiplier), for example. The electric signals are supplied to the control device 20, converted into image data by the control device 20, and supplied to a display device 21. The display device 21 displays an image based on the image data, that is, the image of the sample 2.

The control device 20 also controls the pin hole diameter of the pin hole 17, and controls switching of the fluorescent filter 18.

Figure 2:
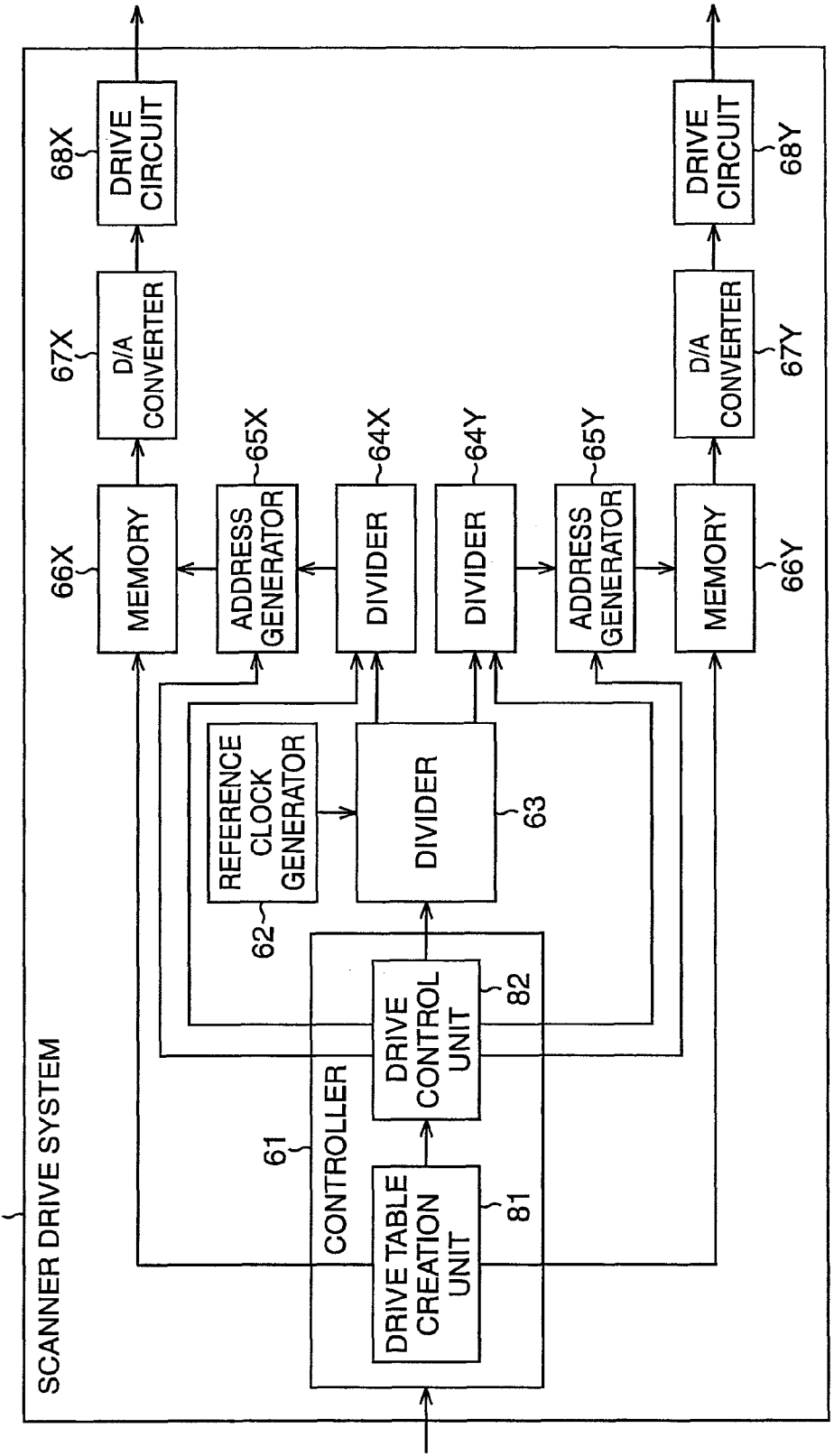
FIG. 2 is a block diagram depicting an example of the configuration of a scanner drive system of the confocal laser scanning microscope.

FIG. 2 is a block diagram depicting an example of a configuration of the scanner drive system 51 which drives the mirror 13X and mirror 13Y, and controls the scanning with the laser light via the scanner 14X and scanner 14Y, out of the elements constituting the control device 20 of the confocal laser scanning microscope 1.

A controller 61 is constituted by a processor, such as a CPU (Central Processing Unit), and controls operation of the scanner drive system 51 in general. The controller 61 also implements functions, including a drive table creation unit 81 and drive control unit 82, by executing predetermined control programs.

The drive table creation unit 81 creates a drive table that is used for generating drive signals to drive the scanner 14X and scanner 14Y so that the instructed scanning area is scanned at an instructed speed, as mentioned later with reference to FIG. 3, and stores it in the memory 66X and memory 66Y. There are two types of drive tables: a table used for the drive circuit 68X (for the x axis) for driving the scanner 14X, and a table for the drive circuit 68Y (for the y axis) for driving the scanner 14Y, and data corresponding to the voltage values of the drive signals, which are output from the drive circuit 68X or the drive circuit 68Y, are arranged in a time series. In other words, the drive table shows time series data for rotating the mirror 13X or mirror 13Y.

The drive table creation unit 81 creates an interpolating drive table which is a drive table for specifying scanning paths between a start point of a scanning area and a start point of a scanning area to be scanned next, as mentioned later with reference to FIG. 3, and stores it in the memory 66X and memory 66Y.

The drive control unit 82 controls the divider 63, divider 64X, divider 64Y, address generator 65X and address generator 65Y, so that the instructed scanning area is scanned at an instructed speed based on the drive table for x axis stored in the memory 66X and the drive table for the y axis stored in the memory 66Y.

In concrete terms, the clock signal generated by the reference clock generator 62, of which frequency is converted by the divider 63 and divider 64X based on control of the drive control unit 82, is supplied to the address generator 65X, where the frequency of the clock signal is converted by the divider 63 and the divider 64Y, then this clock signal is supplied to the address generator 65Y.

The address generator 65X supplies an address signal to instruct an address, from which data is read, to the memory 66X synchronizing with the clock signal from the divider 64X based on control by the drive control unit 82. The memory 66X outputs the data being set in the drive table sequentially to the D/A converter 67X based on the address signal, the D/A converter 67X converts this data into analog signals, and supplies it to the drive circuit 68X. The drive circuit 68X supplies a drive signal of the voltage corresponding to the data read from the drive table to the scanner 14X based on the supplied analog signals, and controls the angle of the mirror 13X.

In the same manner, the address generator 65Y supplies an address signal to instruct an address, from which the data is read, to the memory 66Y, synchronizing with the clock signal from the divider 64Y based on control by the drive control unit 82. The memory 66Y outputs the data being set in the drive table sequentially to a D/A converter 67Y based on the address signals, and the D/A converter 67Y converts this data into analog signals, and supplies it to the drive circuit 68Y. They drive circuit 68Y supplies a drive signal of the voltage corresponding to the data read from the drive table to the scanner 14Y based on the supplied analog signals, and controls the angle of the mirror 13Y.

Now the scanner drive processing that is executed by the scanner drive system 51 will be described with reference to the flow chart in FIG. 3. This processing is started when information to instruct the position and size of the scanning area and speed of scanning each scanning area (e.g. line speed) are input to the controller 61 via an input unit, which is not illustrated, of the confocal laser scanning microscope 1, for example.

Figure 4:
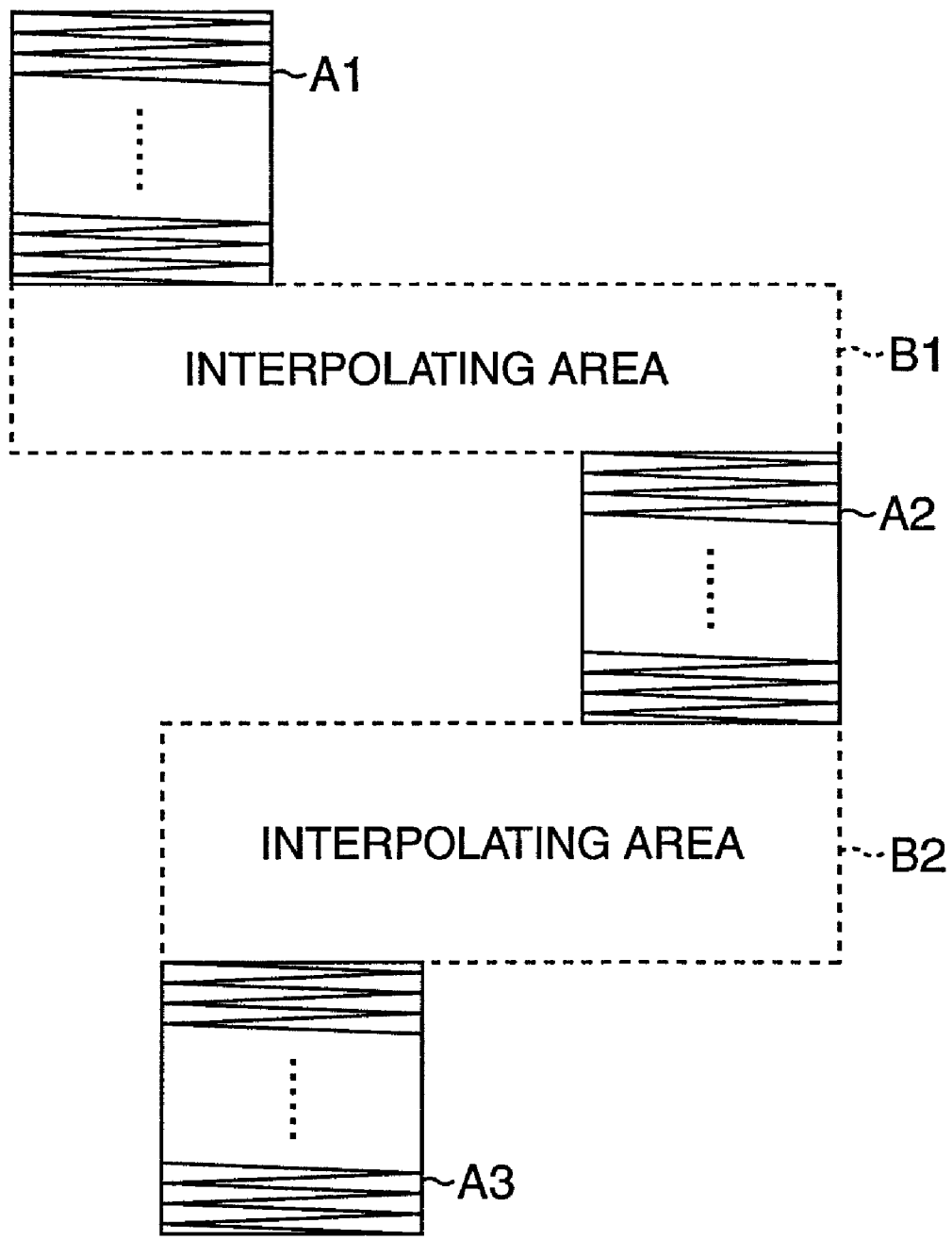
FIG. 4 is a diagram depicting an example of a scanning area and an interpolating area.
Figure 10:
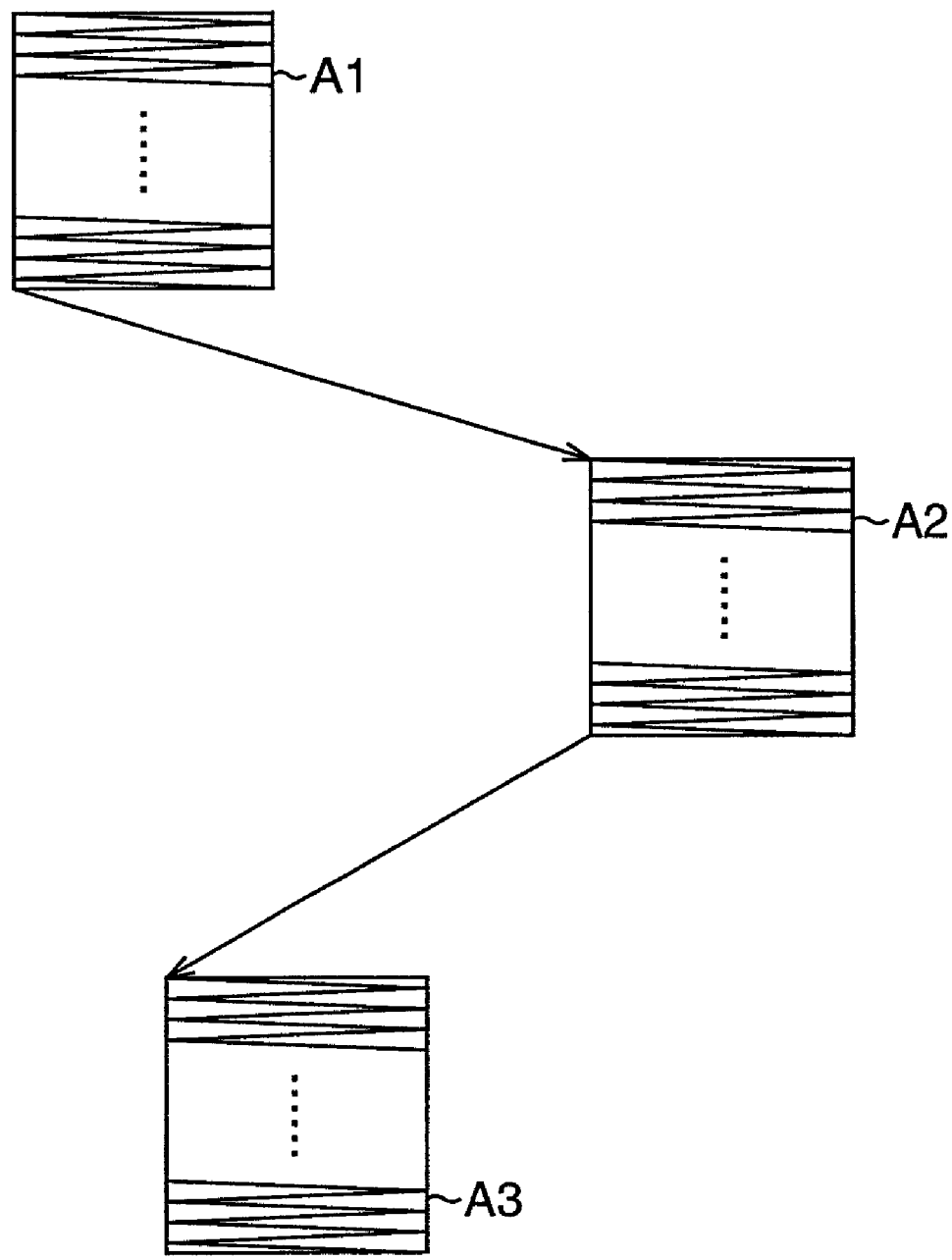
FIG. 10 is a diagram depicting a conventional scanning method.

A case of scanning the scanning area A1 to A3, similar to FIG. 10 in the sequence of the scanning area A1, scanning area A2 and scanning area A3, as shown in FIG. 4, is considered herein below. The area between the scanning area A1 and the scanning area A2 is called "interpolating area B1", and the area between the scanning area A2 and the scanning area A3 is called the "interpolating area B2". It is assumed that raster scanning is performed in the scanning areas A1 to A3.

In step S1, the drive table creation unit 81 creates a drive table.

Figure 5:
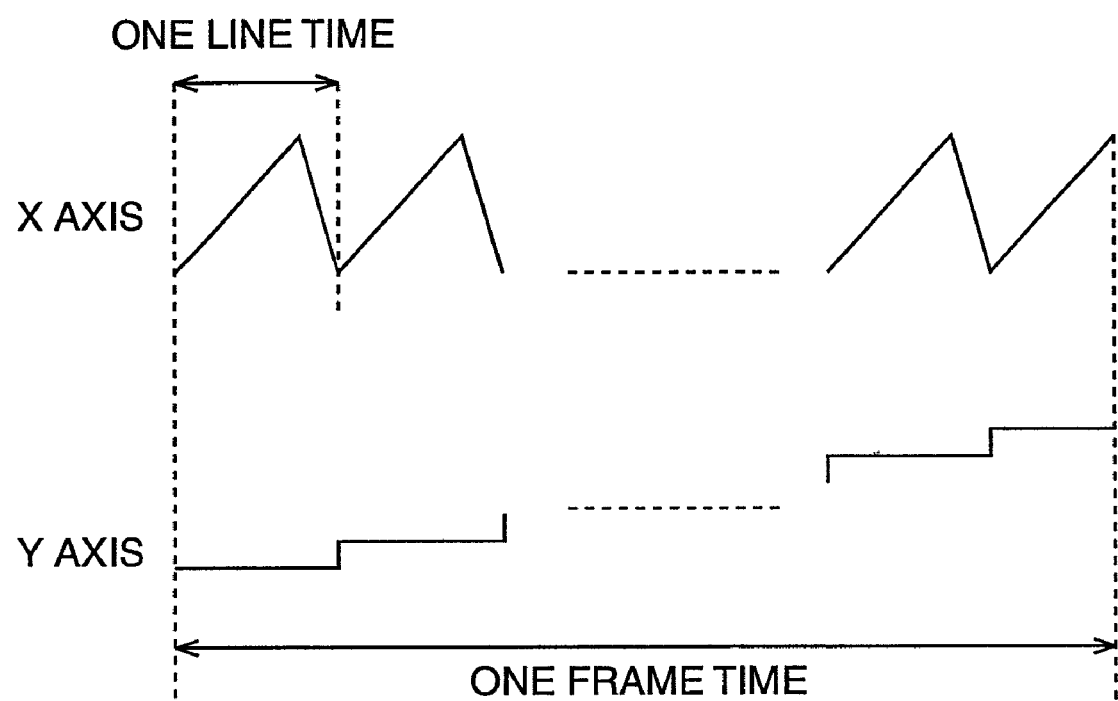
FIG. 5 is a diagram depicting an example of waveforms of a drive signal that is output from a drive circuit.

FIG. 5 shows an example of a waveform of a drive signal which is output from the drive circuit 68X and the drive circuit 68Y when the scanning area is raster-scanned. The waveform at the top in FIG. 5 shows the waveform of the drive signal for the x axis which is output from the drive circuit 68X, and the waveform at the bottom shows the waveform of the drive signal for the y axis which is output from the drive circuit 68Y.

The drive signal for the x axis has a profile in which an angled waveform for one line time, from a scanning start point of a line to a scanning start point of the next line, is repeated (for the final line, the waveform terminates at the scanning end point of the final line, since the scanner moves to the next scanning area without returning to the scanning start point of the next line). The height of the waveform changes depending on the width of the scanning area in the x axis direction, and the offset value of the voltage of the drive signal changes, and the waveform moves in the vertical direction depending on the position of the scanning area in the x axis direction.

The drive signal for the y axis has a step-wise waveform in which the voltage value moves to the height of the next line every time one line of scanning ends. Depending on the position in the y axis direction in the scanning area, the offset value of the voltage of the drive signal changes, and the waveform moves in the vertical direction.

The drive table creation unit 81 creates a drive table to show time series data for generating one line of the drive signals for the x axis in the scanning area A1, and a drive table to show time series data for generating one frame of the drive signals for the y axis in the scanning area A1. As mentioned above, the waveform in the final line is different from the waveform of the other lines, so another drive table may be created for the final lines, and switched with a regular drive table.

In step S2, the drive table creation unit 81 stores the drive table in the memory. In other words, the drive table creation unit 81 stores the drive table for the x axis for the scanning area A1 in the memory 66X, and stores the drive table for the y axis for the scanning area A1 in the memory 66Y.

In step S3, the drive table creation section 81 judges whether there is a scanning area for which the drive table is not created. In the case of this example, the drive table is not created for the scanning area A2 and scanning area A3, so it is judged that there is a scanning area for which the drive table is not created, and processing returns to step S1.

Then the processings from steps S1 to S3 are repeatedly executed until it is judged in step S3 that there is no more scanning areas, for which a drive table is not created.

On the other hand, if it is judged that three is no more scanning areas for which drive tables are not created in step S3, the processing advances to step S4, and in step S4, the drive table creation unit 81 creates an interpolating drive table. In other words, the drive table creation unit 81 creates interpolating drive tables for the x axis and y axis for the interpolating area B1 between the scanning area A1 and the scanning area A2, and interpolating drive tables for the x axis and y axis for the interpolating area B2 between the scanning area A2 and the scanning area A3. The processing in step S4 will be described in detail later.

In step S5, the drive table creation unit 81 stores the interpolating drive tables in the memory. In other words, the drive table creation unit 81: stores the interpolating drive table for the x axis for the interpolating area B1 in the memory 66X in an area immediately after the area where the drive table for the x axis for the scanning area A1 is stored; stores the interpolating drive table for the y axis for the interpolating area B1 in the memory 66Y in an area immediately after the area where the drive table for the y axis for the scanning area A1 is stored; stores the interpolating drive table for the x axis for the interpolating area B2 in the memory 66X in an area immediately after the area where the drive table for the x axis for the scanning area A2 is stored; and stores the interpolating drive table for the y axis for the interpolating area B2 in the memory 66Y in an area immediately after the area where the drive table for the y axis for the scanning area A2 is stored.

Figure 6:
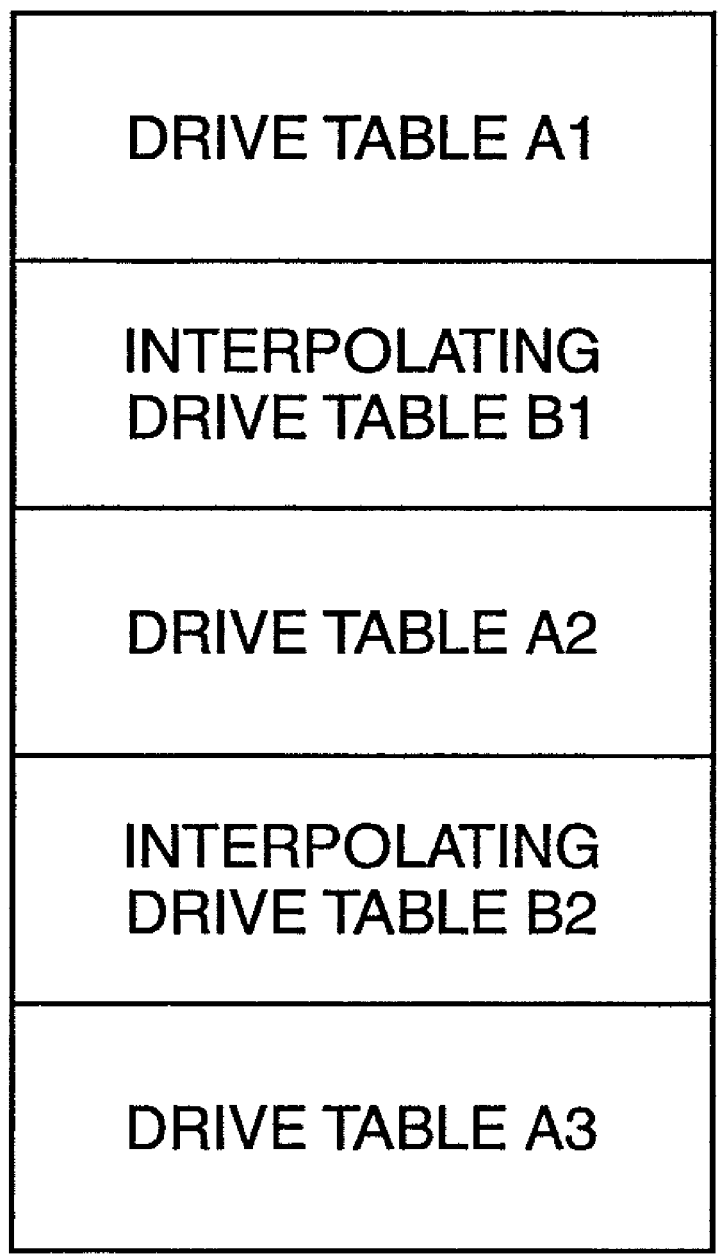
FIG. 6 shows an example of storage areas of a drive table.

Thereby the drive tables are created in the sequence of the drive table for the scanning area A1 (hereafter called "drive table A1"), interpolating drive table for the interpolating area B1 (hereafter called "interpolating table B1"), drive table for the scanning area A2 (hereafter called "drive table A2"), interpolating drive table for the interpolating area B2 (hereafter called "interpolating table B2"), and drive table for the scanning area A3 (hereafter called "drive table A3"), and are stored in the memory 66X and memory 66Y in the sequence of being used for processing, as shown in FIG. 6.

Now the processing in step S4 will be described in detail with reference to FIG. 7 and FIG. 8.

In order to accurately start scanning from the beginning of the scanning area A2 without disposing an auxiliary scanning area before the scanning area A2, after scanning of the scanning area A1 ends, the operation of the scanner 14X, scanner 14Y and scanner drive system 51 must be stabilized before the laser light moves to the beginning of the scanning area A2. For this, it is preferable that the scanning path in the interpolating area B1 becomes closer to the scanning direction of the first line of the scanning area A2 as the laser light approaches the start point of the scanning area A2, and becomes approximately the same as the scanning direction of the first line of the second scanning area A2 when the laser light comes just before the start point of the scanning area A2.

In order to minimize the delay in processing time due to movement from the scanning area A1 to the scanning area A2, it is preferable to set the scanning path such that the total of the scanning paths in the interpolating area B1 is minimized, and the moving distance of the laser light in the x axis direction and y axis direction per unit time becomes as close as possible to the maximum movable distance of the laser light in the x axis direction and y axis direction per unit time. The maximum movable distance of the scanning position in the x axis direction and y axis direction per unit time is specified by the maximum rotation angles per unit time of the mirror 13X and mirror 13Y, which are specified by the maximum acceleration of the scanner 14X and scanner 14Y.

For example, if angular acceleration of the mirrors 13X and 13Y are $\alpha x$ and $\alpha y$ respectively, the rotation angles at the end point of the area A1 are $\theta x1$ and $\theta y1$, and the angular velocities thereof are $\omega x1$ and $\omega y1$, the rotation angles at the start point in the area A2 are $\theta x2$ and $\theta y2$, and the angular velocities thereof are $\omega x2$ and $\omega y2$ respectively, then the angular velocity $\omega x1$, changed at the angular acceleration $\alpha x1$, becomes angular velocity $\omega x2$ t hours later. Therefore in the case of the scanner 14X (x axis) for example, the angular velocity $\omega x2$ of the mirror 13X at the start point in the area A2 is $$\omega x2 = \omega x1 + \alpha x \cdot t \quad (1)$$

and the rotation angle $\theta x2$ of the mirror 13X from the rotation angle $\theta x1$ t hours later is $$\theta x2 = \theta x1 + \int \omega x2 \, dt \times t \quad (2)$$

If Expression (1) is substituted for Expression (2), then the following relationship is established.

$$\theta x2 = \theta x1 + \omega x1 \cdot t + \frac{1}{2} \cdot \alpha x \cdot t2$$

This is a function of t, and the value of the angular acceleration $\alpha x$ is set to a value which does not exceed a maximum angular velocity, which is set in advance. The values of the angular velocity $\omega x1$ and $\omega x2$ are either positive or negative, and positive or negative indicates a rotation direction of the mirror. The values of the angular acceleration $\alpha x$ is also either positive or negative, and this sign indicates either acceleration or deceleration in this rotation direction. As a result, a path of the x axis from the end point of the area A1 to the start point of the area A2 is determined. $\theta y2$ is also determined for the mirror 13Y (y axis), and the drive paths for both axes are determined in this way. In order to smoothly move the mirrors 13X and 13Y from the end point of the area A1 to the start point of the area A2, the interpolating area B1 is divided into a plurality of areas, and the velocity is changed (acceleration or deceleration) by changing the angular acceleration $\alpha x$ for each area.

Since the mirror 13X and mirror 13Y are independently driven, optimum drive control is performed for each mirror, as mentioned above, and as a result, combined paths of the mirror 13X and mirror 13Y are optimized.

Figure 7:
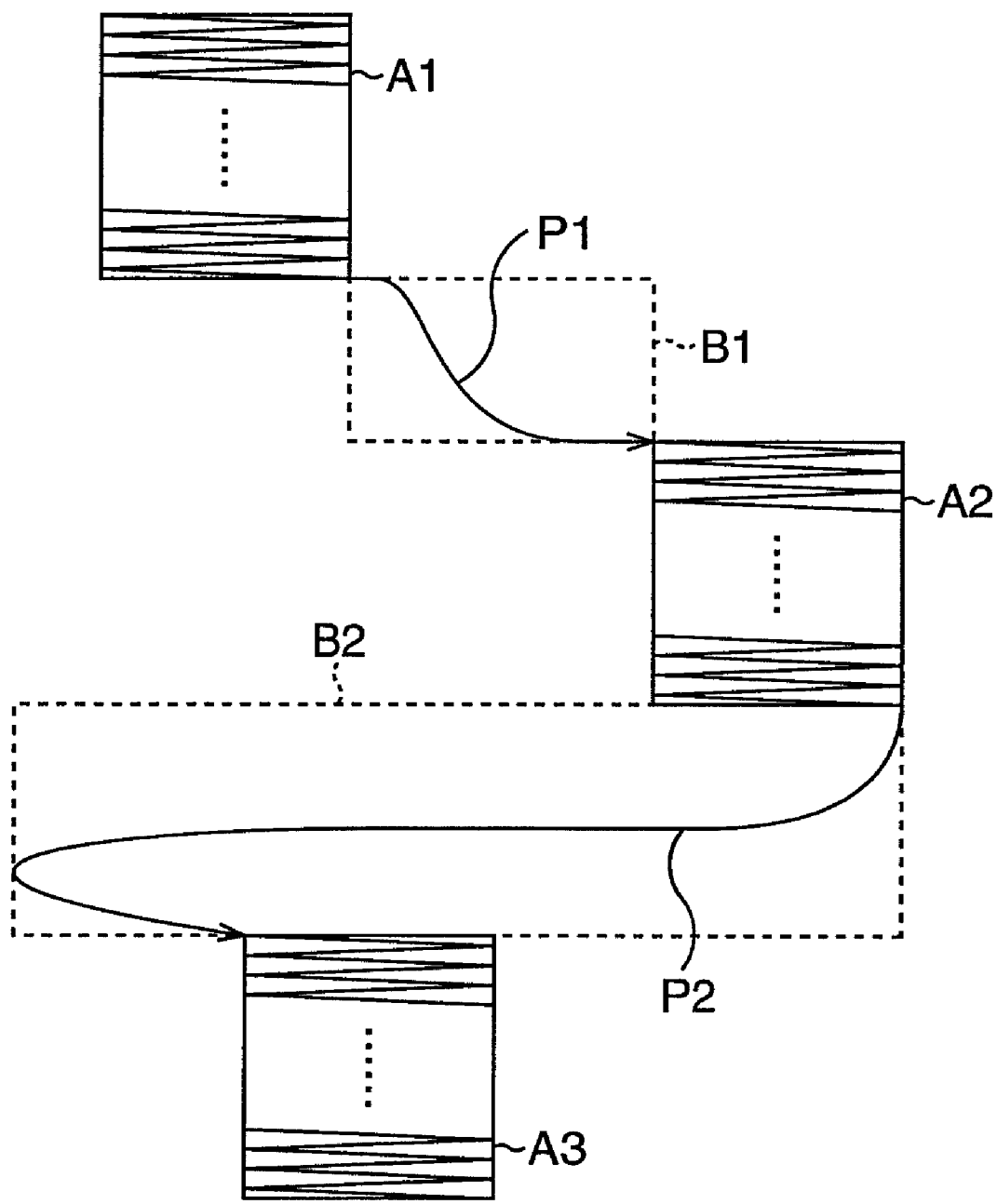
FIG. 7 is a diagram depicting an example of a scanning path among scanning areas.

Considering the above, as the scanning path in the interpolating area B1, a path P1 shown in FIG. 7, for example, which becomes closer to the scanning direction of the first line of the scanning area A2 as the laser light approaches the start point of the scanning area A1, and becomes approximately the same as the scanning direction of the first line of the scanning area A2 when the laser light comes just before the start point of the scanning area A2, so that the combined distance in the x axis direction (horizontal direction) and the y axis direction (vertical direction) is the minimum, is determined.

The drive table creation unit 81 determines the path P1 by performing half cycle sine interpolation between the end point of the scanning area A1 and the start point of the scanning area A2, creates an interpolating drive table B1 for specifying the path P1, that is, an interpolating drive table B1 for performing control for the scanning path to be the path P1, and stores it in the memory 66X and memory 66Y. In the same manner, the drive table creation unit 81 determines a path P2 in the interpolating area B2, creates an interpolating drive table B2 for specifying the path P2, and stores it in the memory 66X and memory 66Y.

Thereby scanning can be started accurately from the beginning of the scanning area A2 and the scanner area A3, without creating an pre-scanning area before the scanning area A2 and scanning area A3, and a delay in processing time due to switching from the scanning area A1 to scanning area A2, and switching from the scanning area A2 to scanning area A3, can be decreased.

In order to stabilize the operation of the scanner 14X, scanner 14Y and scanner drive system 51, and start scanning accurately from the beginning of the scanning area A2, the scanning path may be set such that pre-scanning is performed with a line space wider than that used in the scanning area A2 in the interpolating area B1, while moving from the end point of the scanning area A1 to the start point of the scanning area A2.

Figure 8:
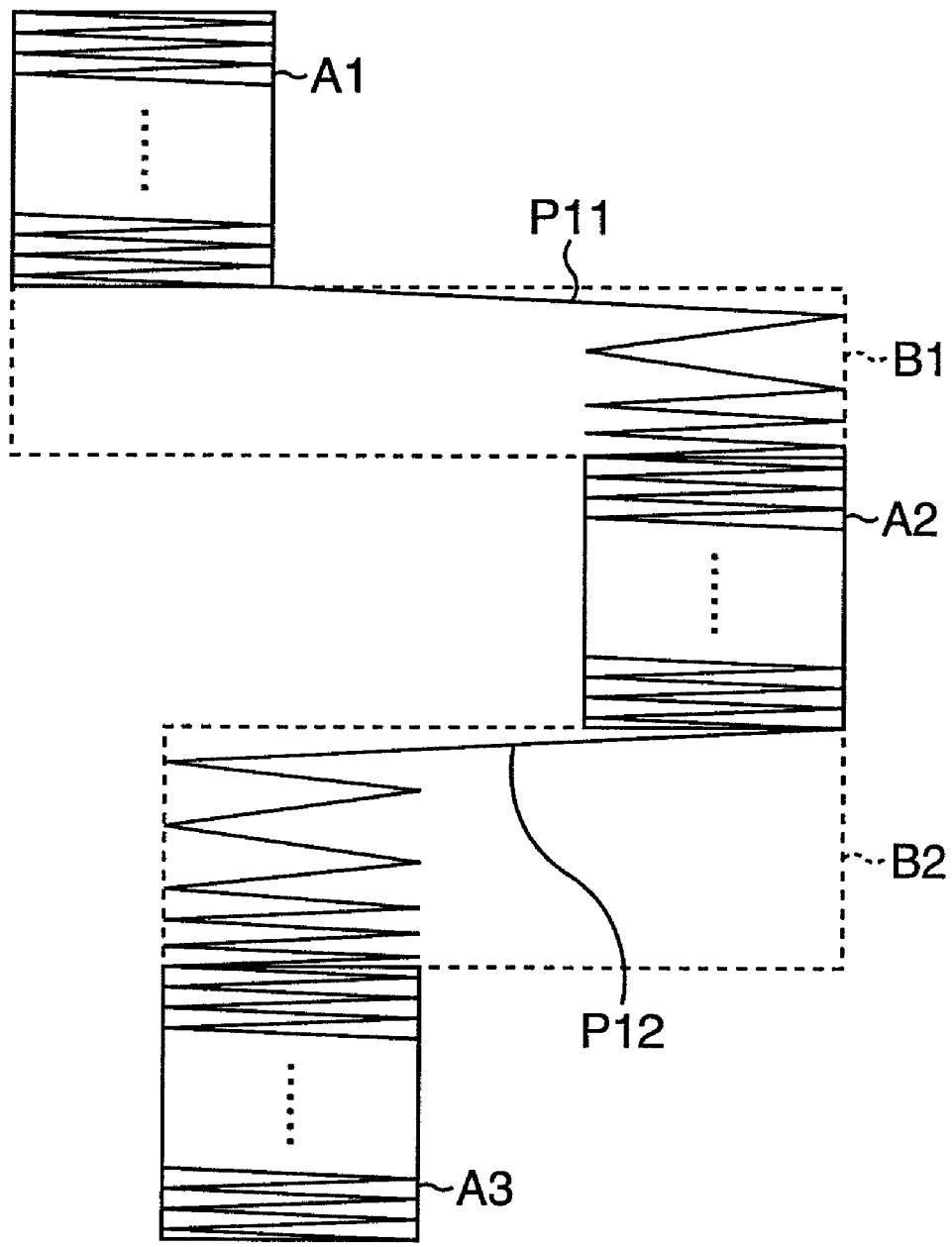
FIG. 8 is a diagram depicting another example of a scanning path among scanning areas.

In this case, as the example in FIG. 8 shows, the drive table creation unit 81 determines a path P11 in which scanning is started with a line space wider than that used in the scanning area A2 in an area which is above the scanning area A2, and is in a same position as the scanning area A2 in the x axis direction (horizontal direction), and becomes closer to the line space in the scanning area A2 as the laser light approaches the scanning area A2, creates an interpolating drive table B1 for specifying the path P11, and stores it in the memory 66X and memory 66Y. In the same manner, the drive table creation unit 81 determines a path P12 in the interpolating area B2, creates an interpolating drive table B2 for specifying the path P12, and stores it in the memory 66X and memory 66Y.

Thereby scanning can be started accurately from the beginning of the scanning area A2 and scanning area A3, and a delay in processing time due to switching from the scanning area A1 to the scanning area A2, and switching from the scanning area A2 to the scanning area A3, can be decreased compared with the case of creating a dedicated auxiliary scanning area before the scanning area A2 and scanning area A3.

Figure 3:
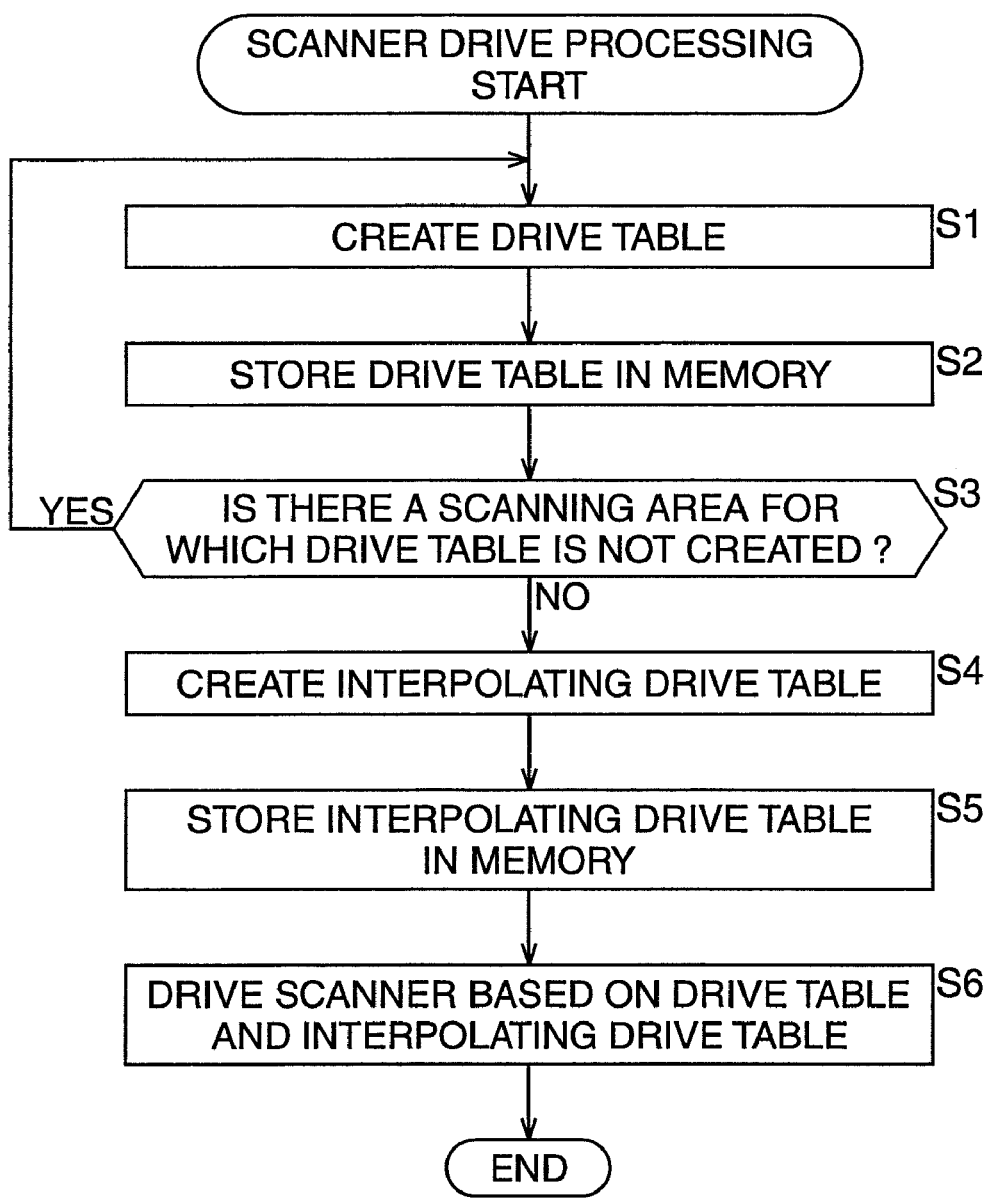
FIG. 3 is a flow chart depicting the scanner drive processing.

Referring to FIG. 3, after the drive table for the scanning area A3 is created and stored in the memory 66X and memory 66Y, processing advances to step S6 if it is judged that there is no more scanning areas for which the drive table is not created in step S3.

In step S6, the scanner drive system 51 drives the mirrors 13X and 13Y based on the drive table and interpolating drive table. In concrete terms, the drive table creation unit 81 notifies the drive control unit 82 that storing of the drive tables completed. The drive control unit 82 sets the dividing ratios in the divider 63, divider 64X and divider 64Y, so that the scanning speed becomes the instructed scanning speed in the scanning area A1.

The drive control unit 82 controls the address generator 65X so that the data in the drive table A1 for the x axis is repeatedly read from the memory 66X for the number of lines in the scanning area A1 sequentially from the beginning, synchronizing with the clock signal from the divider 64X, and is supplied to the D/A converter 67X, and controls the address generator 65Y so that the data in the drive table A1 for the y axis is read from the memory 66Y sequentially from the beginning, and is supplied to the D/A converter 67Y synchronizing with the clock signal from the divider 64Y. However, as mentioned above, the waveform of the drive signal for the x axis ends at the end point of the scanning in the last line, so for the last line of the scanning area A1, the data up to the end point of the scanning of the last line of the drive signal is read from the drive table A1 for the x axis.

Thereby the drive signal based on the drive table A1 for the x axis is output from the drive circuit 68X to the scanner 14X, and the scanner 14X is driven, and the drive signal based on the drive table A1, for the y axis, is output from the drive circuit 68Y to the scanner 14Y, and the scanner 14Y is driven, and the scanning area A1 is scanned.

After the scanning in the scanning area A1 ends, the drive control unit 82 sets the dividing ratios for the divider 63, divider 64X and divider 64Y, so that the scanning speed becomes the scanning speed for the scanning area A2. The drive control unit 82 also controls the address generator 65X so that the data in the interpolating drive table B1 for the x axis is read from the memory 66X sequentially from the beginning, synchronizing with the clock signal from the divider 64X, and is supplied to the D/A converter 67X, and controls the address generator 65Y so that the data in the interpolating drive table B1 for the y axis is read from the memory 66Y sequentially from the beginning, synchronizing with the clock signal from the divider 64Y, and is supplied to the D/A converter 67Y.

Thereby the drive signal based on the interpolating drive table B1 for the x axis is output from the drive circuit 68X to the scanner 14X, and the scanner 14X is driven, and the drive signal based on the interpolating drive table B1 for the y axis is output from the drive circuit 68Y to the scanner 14Y, and the scanner 14Y is driven, and the scanning position of the laser light moves from the end point of the scanning area A1 to the start point of the scanning area A2 according to the path being set (e.g. path P1 in FIG. 7 or path P11 in FIG. 8).

Then the scanning area A2 is scanned in the same manner, the scanning position of the laser light moves from the endpoint of the scanning area A2 to the start point of the scanning area A3 according to the path being set (e.g. path P2 in FIG. 7 or path P12 in FIG. 8), and after the scanning area A3 is scanned, the scanner drive processing ends.

Since the drive table and interpolating drive table are created in advance and stored in the memory 66X and memory 66Y in the sequence of processing, processing to create or overwrite the drive table is not generated every time scanning areas are switched, therefore the processing time can be decreased.

In order to scan the scanning areas A1 to A3 repeatedly, the interpolating drive table B3, for interpolating area B3 between the scanning area A3 and scanning area A1, is created, and it is controlled so as to repeat: scanning the scanning area A1 based on the drive table A1; moving the laser light from the scanning area A1 to the scanning area A2 based on the interpolating drive table B2; scanning the scanning area A2 based on the drive table A2; moving the laser light from the scanning area A2 to the scanning area A3 based on the interpolating drive table B2; scanning the scanning area A3 based on the drive table A3; and moving the laser light from the scanning area A3 to the scanning area A1 based on the interpolating drive table B3. In this case, moving of the laser light between the scanning areas is performed based on the interpolating drive table which is set in advance, a delay in processing time due to switching of the scanning areas can be decreased compared with a case of controlling by determining the scanning path between the scanning areas by computing.

Examples of sequentially scanning a plurality of areas having been described thus far, but the sequence of scanning may be set or changed depending on the scanning target and purpose. For example, it is possible to set or change the sequence so that the areas are scanned in the sequence of one closer to or more distant from a predetermined position, so that the areas are scanned according to a predetermined rule (e.g. in the sequence of a narrower area, or wider area), or to set or change the sequence randomly.

Figure 9:
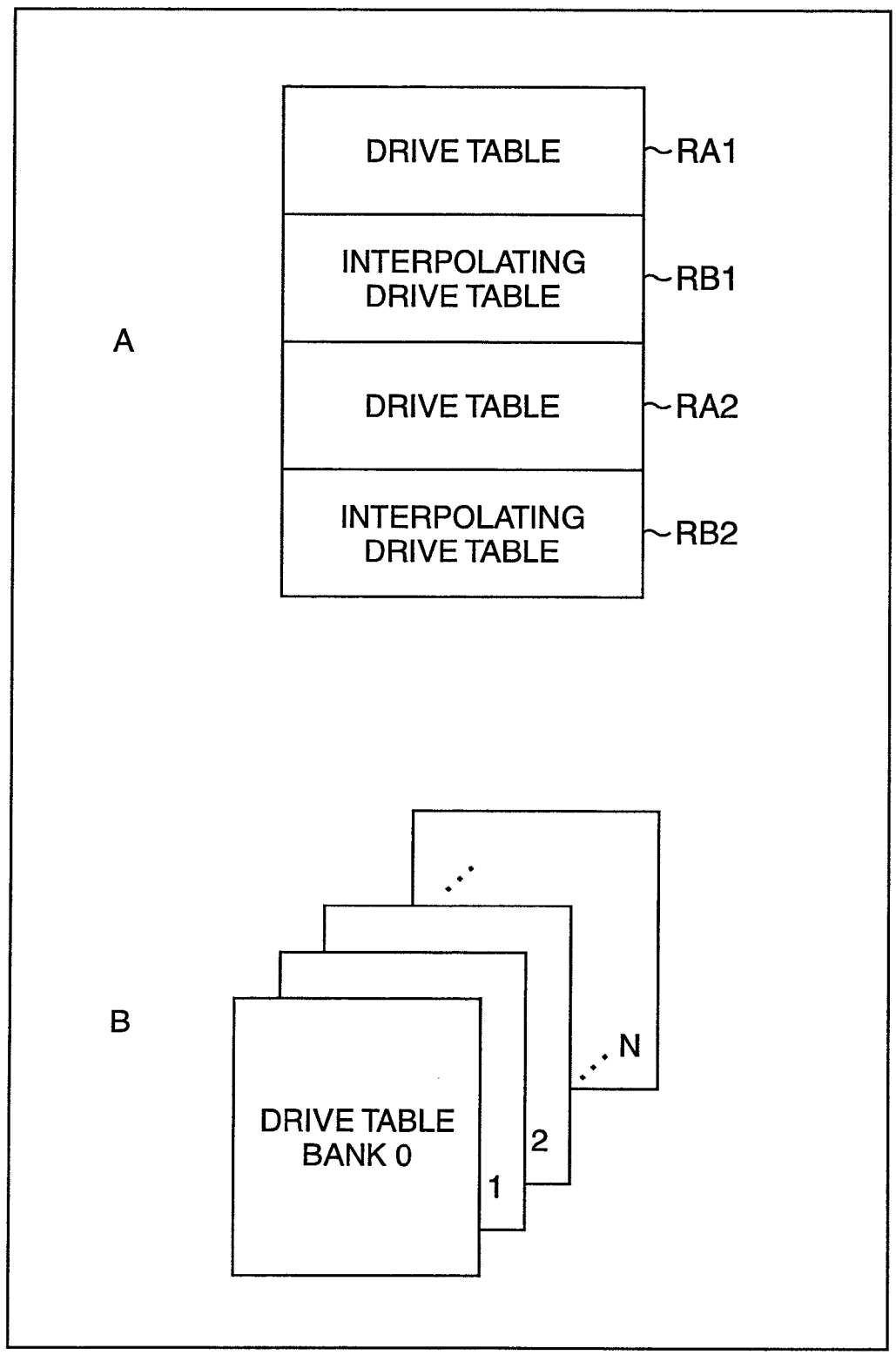
FIG. 9 shows another example of storage areas of a drive table.

In the above described processing, the memory capacity required for storing the drive table and interpolating drive table increases as the number of scanning areas increases. Therefore as FIG. 9A shows, for example, areas are created in advance in the memory 66X and memory 66Y, in the sequence of the area RA1 for the drive table, area RB1 for the interpolating drive table, area RA2 for the drive table, and area RB2 for the interpolating drive table. Then while a scanning area is being scanned based on the drive table stored in the RA1 area, an interpolating drive table for an interpolating area between the scanning area that is currently scanned and a scanning area that is scanned next, and a drive table for the scanning area that is scanned next, are created, and the created interpolating drive table is stored in the area RB1 and the drive table is stored in the area RA2. And while a scanning area is being scanned based on the drive table stored in the area RA2, an interpolating drive table for an interpolating area between the scanning area that is currently scanned and a scanning area that is scanned next, and a drive table for the scanning area that is scanned next, are created, and the created interpolating drive table is stored in the area RB2 and the drive table is stored in the area RA1.

Thereby the memory capacity can be decreased. Since the interpolating drive table and drive table required for the next scanning are created and saved while a current scanning area is being scanned, a delay in processing time can be suppressed.

It is also possible to arrange the drive tables as banks in a same memory space, as shown in FIG. 9B, and implement switching of the drive tables by switching banks of the memory, so as to change to a maximum number of tables with flexibility. FIG. 9B is a diagram showing a case of disposing the drive tables as banks in a same address. In this case, the storage locations of the banks of the drive tables A1 to A3 and the interpolating drive tables B1 and B2 can be anywhere, as long as the read sequence from each banks can be specified.

In the above description, an example of applying the present invention to the confocal laser scanning microscope was shown, but the present invention can also be applied to a laser scanning microscope other than a confocal type.

The processing of three scanning areas were described above, but the present invention can also be applied to processing when two or four or more scanning areas are set. In the above description, a case when the plurality of scanning areas have a same size was shown, but the present invention can also be applied to a case of the scanning area having different sizes.

The above mentioned processings of the scanner drive system 51 can be executed by hardware or software. To execute a series of processings by software, the software is installed from a program recording media to a computer in which programs constituting the software are integrated into dedicated hardware, or to a general purpose personal computer, which can execute various functions by installing various programs.

The programs executed by a computer may be programs with which processings are executed in a time series according to the sequence described in this description, or programs with which processings are executed in parallel, or at a necessary timing, such as when called up.

The embodiments of the present invention are not limited to the above mentioned embodiments, but numerous modifications can be made without departing from the spirit and scope of the invention.

The invention claimed is:

1. A laser scanning microscope that scans a plurality of scanning areas based on a drive table to indicate time series data for driving a scanner used for performing scanning with laser light, comprising:
   creation means for creating an interpolating drive table for specifying a scanning path between an end point of a first scanning area and a start point of a second scanning area which is scanned next to the first scanning area; and
   drive control means for controlling driving of the scanner based on the interpolating drive table between the first scanning area and the second scanning area.

2. The laser scanning microscope according to claim 1, characterized in that
   the creation means creates the interpolating drive table that specifies a scanning path which becomes closer to the scanning direction of the first line of the second scanning area as the laser light approaches the start point of the second scanning area, and becomes approximately the same as the scanning direction of the first line of the second scanning area when the laser light comes just before the start point of the second scanning area.

3. The laser scanning microscope according to claim 1, characterized in that
   the creation means creates the interpolating drive table that specifies a scanning path on which scanning is started with a line space wider than that used in the second scanning area in an area which is above the second scanning area and is in a same position as the second scanning area in the horizontal direction, and the line space becomes closer to that of the second scanning area as the laser light approaches the second scanning area.

4. The laser scanning microscope according to claim 1, further comprising storage means for storing the drive table, characterized in that
   the creation means sequentially stores, in the storage means, the drive table for the first scanning area, the interpolating drive table and the drive table for the second scanning area.

5. A scanner drive device that drives a scanner used for performing scanning with laser light for a laser scanning microscope so as to scan a plurality of scanning areas based on a drive table to indicate time series data for driving the scanner, comprising:
   creation means for creating an interpolating drive table for specifying a scanning path between an endpoint of a first scanning area and a start point of a second scanning area which is scanned next to the first scanning area; and
   drive control means for controlling driving of the scanner based on the interpolating drive table between the first scanning area and the second scanning area.

6. A laser scanning microscope that scans a plurality of scanning areas on a sample by a scanner used for performing scanning with laser light, comprising:
   drive control means for controlling driving of the scanner, so that a first angle at an acute angle side formed by a path between an end point of a first scanning area and a start point of a second scanning area, which is scanned next to the first scanning area, up to just before the start point of the second scanning area, and by an extended line obtained by extending the scanning path from the start point of the second scanning area in an opposite direction of the path direction, becomes smaller than a second angle at an acute angle side formed by a scanning path obtained when the end point of the first scanning area is connected to the start point of the second scanning area with a straight line, and by the extended line.

* * * * *